United States Patent [19]

Tsutsui et al.

[11] Patent Number: 5,468,840
[45] Date of Patent: Nov. 21, 1995

[54] PREPARATION PROCESS OF POLYOXYALKYLENE POLYOLS AND PROCESS OF ALKYLENE OXIDE RECOVERY

[75] Inventors: Tomoki Tsutsui; Tsukuru Izukawa, both of Aichi; Kazuhiko Ohkubo, Kanagawa; Yoshitsugu Sakaki, Aichi, all of Japan

[73] Assignee: Mitsui Toatsu Chemicals, Inc., Tokyo, Japan

[21] Appl. No.: 296,604

[22] Filed: Aug. 29, 1994

[30] Foreign Application Priority Data

Sep. 7, 1993 [JP] Japan .................... 5-221914

[51] Int. Cl.⁶ .................................. C08G 59/68
[52] U.S. Cl. .................. 528/408; 528/409; 568/601; 568/605; 568/618; 568/621; 568/867; 568/914
[58] Field of Search ................... 528/408, 409; 568/601, 605, 618, 621, 867, 914

[56] References Cited

U.S. PATENT DOCUMENTS

| | | | |
|---|---|---|---|
| 3,833,669 | 9/1974 | Gehm et al. | 260/615 |
| 4,122,035 | 10/1978 | Cislo | 252/414 |
| 4,129,718 | 12/1978 | Muzzio | 536/4 |
| 4,355,188 | 10/1982 | Herold et al. | 568/620 |
| 5,095,061 | 3/1992 | Chavez, Jr. et al. | 524/376 |
| 5,254,227 | 10/1993 | Cawlfield et al. | 204/131 |
| 5,342,541 | 8/1994 | Chavez, Jr. et al. | 252/182.27 |

FOREIGN PATENT DOCUMENTS

| | | |
|---|---|---|
| 4-185635 | 7/1992 | Japan . |
| 5-163341 | 6/1993 | Japan . |

*Primary Examiner*—Robert E. Sellers
*Assistant Examiner*—Randy Gulakowski
*Attorney, Agent, or Firm*—Burns, Doane, Swecker & Mathis

[57] ABSTRACT

An alkali metal compound such as metallic cesium, cesium hydroxide, cesium hydroxide monohydrate, metallic rubidium, rubidium hydroxide or rubidium hydroxide monohydrate is used as a catalyst, crude polyoxyalkylene polyol containing the catalyst is neutralized with a mineral acid or an organic acid, an aqueous solution layer containing an alkali metal salt is brought into contact with an anion exchange resin to adsorb mineral acid anion or organic acid anion, the alkali metal compound catalyst is recovered. alkylene oxide undergoes ring-opening addition polymerization on an active hydrogen compound in the presence of the recovered alkali metal compound catalyst to prepare polyoxyalkylene polyol, the catalyst is thereafter separated, recovered and reused, and such recycle of the alkali metal compound catalyst provides an economical process.

3 Claims, No Drawings

PREPARATION PROCESS OF POLYOXYALKYLENE POLYOLS AND PROCESS OF ALKYLENE OXIDE RECOVERY

BACKGROUND OF THE INVENTION

1. Field of the Invention

The present invention relates to a process for recycling a catalyst used for preparing polyoxyalkylene polyol and a preparation process of the polyoxyalkylene polyol. More particularly, the invention relates to a process for recycling the polymerization catalyst of alkylene oxide in the preparation of a polyoxyalkylene polyol which is used for a raw material of polyurethane resin and a surface active agent, and to a preparation process of the polyoxyalkylene polyol by ring-opening addition polymerization of alkylene oxide in the presence of the recycled catalyst.

2. Description of the Related Art

Polyoxyalkylene polyol which is used for a polyurethane raw material is usually prepared by conducting ring-opening addition polymerization of alkylene oxide on an active hydrogen compound initiator in the presence of an alkaline catalyst. In the preparation of polyoxyalkylene polyols, various suggestions have been conventionally made concerning the improvement of their productivity and product qualities.

It has been known in the preparation of polyoxyalkylene polyol that an alkylene oxide increases it's rate of addition polymerization when the alkylene oxide has a high concentration in the reaction, when the reaction temperature is high, and when the amount of the polymerization catalyst, i.e., an alkali metal compound is increased. Improvement of productivity by such methods increases at the same time the content of an unsaturated bond due to a side reaction.

The unsaturated bond results from monool which is formed by the side reaction of propylene oxide, a kind of alkylene oxide, and has a terminal double bond. The monool gives an adverse effect on the quality of prepared polyoxyalkylene polyol and leads to unfavorable results such as reduction in the physical properties of polyurethane resins.

Consequently, the effect of polymerization conditions on the increase in the monool formation has been studied. It has been reported in Kobunshi Ronbunshu, 50, No. 2, 121–126, (1993) that high temperature reaction gives the largest effect on the increase in the unsaturated bond, and that the concentration of alkylene oxide and the concentration of potassium hydroxide polymerization catalyst has a relatively small influence on the formation of unsaturated bond. However, a limitation is imposed upon the pressure resistance of a reaction vessel and the concentration of alkylene oxide is relatively difficult to increase.

It can be carried out with extreme ease to raise the concentration of potassium hydroxide polymerization catalyst. The polymerization catalyst, however, is separated after reaction from crude polyoxyalkylene polyol by neutralization with an acid or washing with water and is thereafter abandoned. Consequently, an increase in the amount of the potassium hydroxide polymerization catalyst gives an adverse effect on the material balance due to adhesion of the product to the salt which is formed by neutralization of the polymerization catalyst or due to the increase in the amount of the washing water and leads to elevation of product cost.

U.S. Pat. No. 3,393,243 has proposed a process for reducing the amount of unsaturated bonds in polyoxyalkylene polyols by using an alkali metal compound other than potassium hydroxide as a polymerization catalyst. Monool formation is suppressed in the case and the process is characterized in that even productivity improvement by faster reaction rate gives no adverse effect on the quality of the product.

In the above reference, a cesium compound is used as the alkali metal compound polymerization catalyst in order to reduce unsaturated bonds in the polyoxyalkylene polyol obtained. After finishing polymerization, the reaction mixture is neutralized with a neutralization agent composed of water and oxalic acid, dehydrated and filtered to remove the cesium salt. However, no description is found on the recycling of the cesium compound catalyst. The cesium compound is very expensive and the process has a defect of being less economical.

Various techniques for recycling the cesium compound catalyst have been investigated. For example, crude polyoxyalkylene polyol by polymerization in the presence of a cesium compound catalyst is neutralized by adding an organic acid such as oxalic acid and water. The cesium salt thus obtained is separated. A mixture of the separated cesium salt and the polyoxyalkylene polyol adhered thereto is calcined to form cesium oxide, cesium oxide is successively hydrated to recover cesium hydroxide, and the recovered cesium hydroxide is reused as a polymerization catalyst for preparing a polyoxyalkylene polyol. The process, however, has a problem of cost increase resulting from burning off the organic acid for use in neutralization and a problem of fuel cost required for the calcination, and is thus unfavorable for cost reduction.

In another technique, the crude polyoxyalkylene polyol as intact which is obtained by polymerization in the presence of a cesium compound catalyst, or an aqueous solution of a cesium salt obtained by neutralizing the crude polyoxyalkylene polyol with an organic acid and/or a mineral acid and water, is brought into contact with a cation exchange resin to adsorb a cesium ion to the cation exchange resin. Successively the cesium ion is recovered by a basic eluent in the form of cesium hydroxide which is a polymerization catalyst in the preparation of polyoxyalkylene polyol. The process, however, has a problem of reducing the activity and the efficiency as a polymerization catalyst of alkylene oxide because the eluent contaminates the aqueous solution of cesium hydroxide and decreases purity of cesium hydroxide.

SUMMARY OF THE INVENTION

One object of the invention is, in the preparation of a crude polyoxyalkylene polyol by polymerization of an alkylene oxide in the presence of an alkali metal compound catalyst, to provide a process for recycling a catalyst with efficiency and economy, and further to provide a process for preparing the polyoxyalkylene polyol by reusing the recovered catalyst.

As a result of an intensive study in order to solve the above problems, the present inventors have found that, in a process for preparing polyoxyalkylene polyol by polymerization of alkylene oxide in the presence of an alkali metal compound catalyst, the alkylene oxide polymerization catalyst used for preparing polyoxyalkylene polyol can be recycled with efficiency and economy from the alkali metal salt obtained by neutralization of crude polyoxyalkylene polyol with a mineral acid or an organic acid, and that the recovered alkylene oxide polymerization catalyst can be reused for the preparation of polyoxyalkylene polyol.

That is, a first aspect of the invention is a preparation process of polyoxyalkylene polyol comprising ① a neutralization step for adding a neutralizing agent composed of water and a mineral acid or an organic acid to crude polyoxyalkylene polyol containing an alkali metal compound catalyst, ② a desalting step for dehydrating and drying the liquid obtained in ① and thereafter removing a deposited alkali metal salt by filtration, ③ a recovery step of an alkylene oxide polymerization catalyst used for preparing polyoxyalkylene polyol by bringing the alkali metal salt obtained in ② into contact with an OH-type anion exchange resin in the form of an aqueous solution of the alkali metal salt and conducting ion exchange by absorption of a mineral acid anion or an organic acid anion, and ④ a preparation step of a polyoxyalkylene polyol comprising conducting ring-opening addition polymerization of alkylene oxide on an active hydrogen compound initiator in the presence of the polymerization catalyst which is recovered in ③.

A second aspect of the invention is a preparation process of polyoxyalkylene polyol comprising that the aqueous solution of the alkali metal salt is obtained by adding, after the desairing step ② of the first aspect of the invention, water or a mixture of water and an organic solvent to a mixture of an alkali metal salt and the polyoxyalkylene polyol, and by separating into a polyoxyalkylene polyol layer and a layer of the aqueous alkali metal salt solution.

Further, a third aspect of the invention is a recovering process of an alkylene oxide polymerization catalyst comprising the neutralization step ①, the desalting step ②, and the recovery step ③ in the first aspect of the invention.

According to the Process of the invention, the alkylene oxide polymerization catalyst can be recycled with efficiency from a purified salt obtained from crude polyoxyalkylene polyol and polyoxyalkylene polyol can be prepared with economy by reusing the recovered catalyst.

DETAILED DESCRIPTION OF PREFERRED EMBODIMENTS

Exemplary alkali metal compound catalysts which can be used in the invention include metallic sodium, sodium hydroxide, metallic potassium, potassium hydroxide, metallic rubidium, rubidium hydroxide, metallic cesium, cesium hydroxide, and monohydrate of sodium hydroxide, potassium hydroxide, rubidium hydroxide and cesium hydroxide. Preferred catalysts are metallic rubidium, rubidium hydroxide, metallic cesium, cesium hydroxide and hydrates of these hydroxides. More preferred catalysts are metallic cesium, cesium hydroxide and hydrates thereof, monohydrate in particular. The most preferred catalysts are cesium hydroxide and its monohydrate.

It is desired that these catalysts are added to an active hydrogen compound initiator or a polyoxyalkylene polyol, successively heat dehydration or dehydrogenation is conducted to convert the active hydrogen compound to alcoholate, and then addition polymerization of alkylene oxide is carried out. These catalysts, however, can also be used as intact for the polymerization of alkylene oxide, when desired. No particular restriction is imposed upon reuse of the alkali metal compound catalyst obtained from the recovery step of the invention.

The amount of the alkali metal compound catalyst is preferably in the range of 0.01–5 parts by weight for 100 parts by weight of polyoxyalkylene polyol after finishing the addition polymerization of alkylene oxide.

The crude polyoxyalkylene polyols of the invention include those having any molecular weight which are obtained by addition polymerization of alkylene oxide on a known active hydrogen compound initiator in the presence of the alkali metal compound catalyst. The known active hydrogen compound initiators include, for example, methanol, ethanol, butanol and other monohydric alcohols; propylene glycol, 1, 4-butanediol and other dihydric alcohols; glycerol, pentaerythritol, sorbitol, sugar and other polyhydric alcohols; monoethanolamine, diethanolamine, triethanolamine and other alkanolamines; ethylene diamine and other aliphatic amines; aniline, tolylenediamine, diphenylmethanediamine and other aromatic amines; hisphenol A, novolac and other phenol compounds; and water. Low molecular weight polyoxyalkylene polyols obtained by adding several moles of alkylene oxide to these active hydrogen compound initiators by using a known method can also be used as active hydrogen compound initiators.

Crude polyoxyalkylene polyol is obtained by conducting ring-opening addition polymerization of alkylene oxide on the active hydrogen compound initiator in the presence of the alkali metal compound catalyst. A portion of terminal hydroxy groups in polyoxyalkylene polyol has structure of alkali metal alcoholate. Both homemade and purchased polyoxyalkylene polyols can be used.

Exemplary alkylene oxides which can be used in the invention include, propylene oxide, ethylene oxide, butylene oxide, styrene and other known alkylene oxides. These alkylene oxides can be used singly or in combination.

No particular limitation is put upon the amount of alkylene oxide which is polymerized by addition. However, the preferred amount is usually in the range of 1–120 moles per mole of a hydroxyl group in the active hydrogen compound initiator. The addition polymerization can be carried out by using a known method under normal conditions.

Neutralization of crude polyoxyalkylene polyol can be conducted by addition of water and a neutralizing agent in the temperature range of 50°–120° C. Industrial water, ion exchanged water or distilled water can be used depending upon the object. The amount of water is preferably in the range of 0.05–30 parts by weight for 100 parts by weight of crude polyoxyalkylene polyol.

Exemplary neutralizing agents include mineral acids such as phosphoric acid, hydrochloric acid, sulfuric acid, sulfurous acid carbonic acid; and organic acids such as formic acid, oxallic acid, succinic acid, acetic acid and maleic acid. These neutralizing agents can be used singly or in combination.

After the above neutralization treatment, the crude polyoxyalkylene polyol can also be subjected to adsorption treatment by using an adsorbent, when desired. Synthetic magnesium silicate is preferably used as the adsorbent and is marketed under the Trade Mark of TOMIX-AD600NS, AD600B and AD 300(manufactured by Tomita Pharmaceutical Co., Ltd. and KYOWAAD 400 and 600 (manufactured by Kyowa Chemical Industry Co., Ltd. )

The alkylene oxide polymerization catalyst used for the preparation of polyoxyalkylene polyol in the invention can be recovered by the following process.

The pH value is adjusted to 3.0–9.0 by adding water and a neutralizing agent to crude polyoxyalkylene polyol obtained by polymerizing alkylene oxide in the presence of an alkali metal compound catalyst, water is removed by heating to 50°–120° C. under reduced pressure, and deposited alkali metal salt is filtered. Water is added to the filtered alkali metal salt to obtain an aqueous solution of the alkali metal salt. However, a small amount of polyoxyalkylene polyol usually adheres to the alkali metal salt. Thus, water or a mixture of water and an organic solvent is added to the filtered alkali metal salt, the resulting mixture is mixed by stirring usually at 10°–100 ° C., and is preferably allowed to stand. The mixture is separated into a polyoxyalkylene polyol layer and an aqueous solution layer of the alkali metal salt. The aqueous solution layer of the alkali metal salt is isolated and brought into contact with an OH type anion exchange resin to recover the alkali metal hydroxide by adsorbing a mineral acid anion or organic acid anion. Exemplary organic solvents which can be used for the mixture of water and the organic solvents to be added include n-hexane and other aliphatic hydrocarbons; cyclopentane and other alicyclic hydrocarbons; benzene, toluene and other aromatic hydrocarbons; and carbon tetrachloride, chloroform, methylene chloride and other halogenareal hydrocarbons.

The polyoxyalkylene polyol which is adhered to the alkali metal salt and separated into a layer in the above process can be added to the crude polyoxyalkylene polyol obtained by polymerization. Thus, the loss of polyoxyalkylene polyol in the purification step is favorably reduced.

No particular limitation is imposed upon the concentration of the aqueous solution of alkali metal salt to be treated with the anion exchange resin. The concentration which is usually preferred is in the range of 0.01–50% by weight. Even though an aqueous solution of the alkali metal salt has concentration outside of the range, the subject matter of the invention is not impaired.

The anion exchange resin which can be preferably used in the invention has a structure comprising a styrene-divinylbenzene copolymer as a carrier and a quaternary ammonium salt compound on the side chain as an ion exchange group. As to the morphology of the resin, both gel type and macroporous type anion exchange resins can be used for the invention. Such types of ion exchange resin are marketed under the trade mark of LEWATIT MP 500, M 500, M 504, MP 600 and MP 500A (manufactured by Bayer Ag.), DIAION PA 406, PA 408 and PA 412 (manufactured by Mitsubishi Kasei Co. Ltd.), AMBERLITE IRA 430, IRA 458 and IRA 900 (manufactured by Rohm & Haas Co., Ltd.)

These anion exchange resins are used after converting a portion or all of the resin through a conventionally known means to the OH type as a counter anion of the quaternary ammonium cation. On the other hand, marketed anion exchange resins which are already converted to the OH type can be used as such. No particular restriction is imposed upon the use temperature of the ion exchange resin. The resin is usually used in the range of preferably 10°–100° C.

Ion exchange can be conducted by passing the aqueous solution of the alkali metal salt through a column packed with the ion exchange resin or by stirring the aqueous solution with the ion exchange resin in a vessel.

The aqueous solution of alkali metal salt is ion-exchanged and converted to an aqueous solution of alkali metal hydroxide. Consequently, the aqueous solution of alkali metal hydroxide can be used as intact or after concentrating to a desired concentration for the polymerization of alkylene oxide as an alkali metal compound catalyst. Further, the aqueous solution of alkali metal hydroxide is dehydrated and can also be used in the form of solid alkali metal hydroxide as the alkali metal compound catalyst in the preparation of the above polyoxyalkylene polyol. The alkali metal compound catalyst thus recovered can be used as a polymerization catalyst of alkylene oxide in the preparation of polyoxyalkylene polyol, recovered and used again for the preparation of polyoxyalkylene polyol as the polymerization catalyst of alkylene oxide.

Polyoxyalkylene polyol can be prepared by removing the alkylene oxide polymerization catalyst from crude polyoxyalkylene polyol and further carrying out purification. The preparation process is the same as that of the above mentioned crude polyoxyalkylene polyol. However, the alkylene oxide polymerization catalyst which was already used in the preparation of polyoxyalkylene polyol and subjected to the recovery step is reused for the preparation of polyoxyalkylene polyol in the invention. The form in use of the alkylene oxide polymerization catalyst can be a dehydrated solid or an aqueous solution.

As the recovery ratio of the catalyst is lower than 100%, a new alkali metal compound catalyst is supplemented to the recovered alkali metal hydroxide catalyst according to the deficient amount of catalyst for recycling use.

That is, a polyoxyalkylene polyol is prepared with a constant amount by the following steps;

(i) a preparation step of crude polyoxyalkylene polyol for conducting ring-opening addition polymerization of alkylene oxide on an active hydrogen compound initiator in the presence of an alkali metal compound catalyst, (ii) a neutralization step for adding a neutralizing agent composed of water and a mineral acid or an organic acid to the catalyst containing crude polyoxyalkylene polyol which is obtained in the preparation step, (iii) a desalting step for dehydrating and drying the liquid obtained in the neutralization step and thereafter removing a deposited alkali metal salt by filtration, (iv) a recovering step of an aqueous alkali metal hydroxide solution by preparing an aqueous solution from the alkali metal salt obtained in the desalting step, bringing the aqueous solution into contact with a OH-type anion exchange resin, conducting ion exchange by adsorption of a mineral acid anion or an organic acid anion, and adding a required amount of the alkali metal compound catalyst to the aqueous alkali metal hydroxide solution obtained in the recovering step so as to feed the resulting mixture of the catalysts to the preparation step (i).

Further, the reaction can also be conducted batch wise, semibatch wise or continuously.

EXAMPLE

The present invention will hereinafter be illustrated by way of examples and comparative examples.

Example 1

To a nitrogen substituted reaction vessel, 150 g of glycerol as an active hydrogen compound initiator and 113 g of a 50% aqueous cesium hydroxide solution as a catalyst were charged. Successively the mixture was heated to 105° C. and dehydrated under reduced pressure of 10 mmHg until a dehydration rate exceeded 90%. Thereafter 9650 g of propylene oxide (hereinafter referred to simply as PO) was gradually charged at 105° C. under internal pressure of 4 kg/cm$^2$G and reacted for 13 hours. After finishing the reaction, the unreacted PO was removed from the reaction mixture under reduced pressure to obtain 9820 g of crude polyoxyalkylene polyol.

Next, the crude polyoxyalkylene polyol was neutralized by adding 10% by weight of water for the crude polyoxyalkylene polyol and an equimolar amount of phosphoric acid to cesium hydroxide. After neutralization, water was removed from crude polyoxyalkylene polyol and deposited cesium salt was separated. Purified polyoxyalkylene polyol thus obtained by removing the cesium salt had a hydroxyl value of 28 mgKOH/g and viscosity of 1100 cps/25° C.

Next, an anion exchange resin was converted to OH type by passing 7% by weight of aqueous sodium hydroxide solution of which amount is 50 times the ion exchange capacity through 200 ml of a chlorine type anion exchange resin (LEWATIT MP 500).

Water was added to the above separated cesium salt to form a 15% aqueous solution (hereinafter referred to simply as the aqueous solution A). Phosphoric acid ion concentration of the aqueous solution A was 54.7 mg/ml. Successively, 100 ml of the aqueous solution A and 200 ml of the above OH type anion exchange resin were charged to a flask and stirred for 15 minutes to adsorb phosphoric acid ion. The mixture was filtered.

The aqueous cesium hydroxide solution thus obtained had purity of 98% by weight and contained a very small amount of cesium salt (1.10 mg/ml as phosphoric acid ion concentration). The recovery rate of cesium was 99%.

Example 2

To a reaction vessel containing 7850 g of crude polyoxyalkylene polyol obtained in Example 1, 1300 g of ethylene oxide was gradually charged at 105° C. under an internal pressure of 4 kg/cm$^2$G and reacted for 4 hours.

After finishing the reaction, the reaction mixture was neutralized with phosphoric acid by the same procedures as carried out in Example 1, and dehydrated. Deposited cesium salt was removed. Thus purified polyoxyalkylene polyol had a hydroxyl value of 24 mgKOH/g and viscosity of 1300 cps/25° C.

Water was added to the separated cesium salt to form a 15% aqueous solution (hereinafter referred to as an aqueous solution B). Successively, 100 ml of the aqueous solution B and 200 ml of an OH type anion exchange resin (LEWATIT MP 500) obtained by the same procedures as carried out in Example 1 were charged in a flask and stirred at 20° C. for 15 minutes to adsorb phosphoric acid ion. The mixture was filtered to obtain an aqueous solution of cesium hydroxide.

The aqueous cesium hydroxide solution had purity of 99% by weight and contained a very small amount of cesium salt. The recovery rate of cesium was 96%.

Example 3

To a reaction vessel containing 500 g of pentaerythritol-PO addition product having a hydroxyl value of 450 mgKOH/g, 70 g of a 50% aqueous cesium hydroxide solution was charged as a catalyst. PO was added by the same procedures as carried out in Example 1. After finishing the reaction, the unreacted PO was removed from the reaction mixture under reduced pressure to obtain 7900 g of a crude polyoxyalkylene polyol.

The crude polyoxyalkylene polyol was neutralized with phosphoric acid by the same procedures as carried out in Example 1 and dehydrated to remove deposited cesium salt. Thus purified polyoxyalkylene polyol had a hydroxyl value of 28 mgKOH/g and viscosity of 1400 cps/25° C.

Water was added to the separated cesium salt to form a 15% aqueous solution (hereinafter referred to as an aqueous solution C). Successively, 100 ml of the aqueous solution C and 200 ml of a OH type anion exchange resin (LEWATIT MP 500) obtained by the same procedures as carried out in Example 1 were charged to a flask and stirred at 20° C. for 15 minutes to adsorb phosphoric acid ion. The mixture is filtered to obtain an aqueous cesium hydroxide solution. The aqueous cesium hydroxide solution had purity of 98% by weight and contained a very small amount of cesium salt. The recovery rate of cesium was 96%.

Example 4

The same procedures as described in Example 1 are carried out except that 77 g of a 50% aqueous rubidium hydroxide solution is charged as a catalyst in place of the 50% aqueous cesium hydroxide solution. After finishing the reaction, the unreacted PO is removed from the reaction mixture. Crude polyoxyalkylene polyol thus obtained is 9820 g.

Neutralization is conducted by adding 5% by weight of water and an equimolar amount of phosphoric acid to rubidium hydroxide to the crude polyoxyalkylene polyol obtained. Thereafter, water is removed to deposit rubidium salt. The deposited rubidium salt is separated and purified polyoxyalkylene polyol is obtained.

Water is added to the separated rubidium salt to form a 15% aqueous solution (hereinafter referred to as an aqueous solution D). Successively, 100 ml of the aqueous solution D and 200 ml of the OH type anion exchange resin obtained by the same procedures as carried out in Example 1 are put in a flask and stirred at 20° C. for 15 minutes to adsorb phosphoric acid ion.

The mixture is filtered to obtain an aqueous rubidium hydroxide solution having purity of 97% by weight and containing a very small amount of rubidium salt. The recovery rate of rubidium is 95%.

Example 5

The same procedures as described in Example 1 are carried out except that 40 g of a 50% aqueous potassium hydroxide solution is charged as a catalyst in place of the 50% aqueous cesium hydroxide solution. After finishing the reaction, unreacted PO is removed from the reaction mixture. Crude polyoxyalkylene polyol thus obtained is 9820 g.

Neutralization is conducted by adding 5% by weight of water and an equimolar amount of phosphoric acid with potassium hydroxide to the crude polyoxyalkylene polyol obtained. Thereafter water is removed to deposit potassium salt. The deposited potassium salt is separated and purified polyoxyalkylene polyol is obtained.

Water is added to the separated potassium salt to form a 15% aqueous solution (hereinafter referred to as an aqueous solution E). Successively, 100 ml of the aqueous E and 200 ml of the OH type anion exchange resin obtained by the same procedures as carried out in Example 1 are charged in a flask and stirred at 20° C. for 15 minutes to adsorb phosphoric acid ion. The mixture is filtered to obtain on aqueous potassium hydroxide solution having purity of 97% by weight and containing a very small amount of potassium salt. The recovery rate of potassium is 95%.

Example 6

Neutralization was conducted by adding 5% by weight of water and an equimolar amount of phosphoric acid with cesium hydroxide to the crude polyoxyalkylene polyol prepared by the same procedures as described in Example 2. After neutralization, water was removed and cesium salt was separated by filtration.

The separated cesium salt contained 40% by weight of adhered polyoxyalkylene polyol. Water having temperature of 70° C. was added to the separated cesium salt, the resulting mixture was stirred at 80° C. and allowed to stand. The mixture separated into two layers. The lower layer was an aqueous cesium phosphate solution. The lower layer was isolated and water was added into the isolated layer so as to form a 15% aqueous cesium phosphate solution (hereinafter referred to as an aqueous solution F).

The aqueous solution F had a phosphoric acid ion concentration of 63.2 mg/ml. Successively, 100 ml of the aqueous solution F and 200 ml of the OH type anion exchange resin (LEWATIT MP 500) obtained by the same procedures as carried out in Example 1 were placed in a flask and stirred at 20° C. for 15 minutes to adsorb phosphoric acid ion. The mixture was filtered to obtain an aqueous cesium hydroxide solution having purity of 98% by weight and containing a very small amount of cesium salt (phosphoric acid ion concentration of 1.26 mg/ml). The recovery rate of cesium was 90%.

Example 7

Neutralization was conducted by adding 5% by weight of water and an equimolar amount of phosphoric acid to cesium hydroxide to the crude polyoxyalkylene polyol prepared by the same procedures as carried out in Example 3. After neutralization, water was removed and cesium salt was isolated by filtration.

The separated cesium salt had 40% by weight of adhered polyoxyalkylene polyol. Water having temperature of 70° C. was added to the separated cesium salt, the resulting mixture was stirred at 80° C. and allowed to stand. The mixture was separated into two layers. The lower layer which was an aqueous cesium phosphate solution was isolated and water was added into the isolated layer so as to form a 15% aqueous cesium phosphate solution (hereinafter referred to as an aqueous solution G). The aqueous solution G had a phosphoric acid ion concentration of 63.2 mg/ml.

Successively, 100 ml of the aqueous solution G and 200 ml of the OH type anion exchange resin (LEWATIT MP 500) obtained by the same procedures as carried out in Example 1 were charged in a flask and stirred at 20° C. for 15 minutes to adsorb phosphoric acid ion. The mixture was filtered to obtain an aqueous cesium hydroxide solution having purity of 98% by weight and a very small amount of cesium salt (phosphoric acid ion concentration of 1.26 mg/ml). The recovery rate of cesium was 75%.

Example 8

The aqueous cesium hydroxide solution obtained in Example 6 (aqueous solution F) was concentrated to obtain an aqueous cesium hydroxide solution having concentration of 50% by weight.

To a nitrogen substituted reaction vessel, 150 g of glycerol as an active hydrogen compound initiator and 113 g of the 50% aqueous cesium hydroxide solution obtained above were charged. Successively, the mixture was heated to 105° C. and dehydrated under reduced pressure of 10 mmHg until the dehydration rate exceeded 90%. Thereafter 9650 g of PO was gradually charged at 105° C. under pressure of 4 kg/cm² and reacted for 13.5 hours. After finishing the reaction, the unreacted PO was removed under reduced pressure to obtain 9820 g of crude polyoxyalkylene polyol.

Neutralization was conducted by adding 5% by weight of water and an equimolar amount of phosphoric acid to cessium hydroxide to the crude polyoxyalkylene polyol. After neutralization, water was removed and deposited cesium salt was filtered off to obtain purified polyoxyalkylene polyol. The purified polyoxyalkylene polyol had a hydroxyl value of 28 mgKOH/g and viscosity of 1100 cps/25° C. The product was the same in qualities as obtained in Example 1.

Example 9

To a nitrogen substituted reaction vessel, 300 g of glycerol as an active hydrogen compound initiator and 80 g of a 50% aqueous cesium hydroxide solution were charged. Successively, the mixture was heated to 105° C. and dehydrated under reduced pressure of 10 mmHg until the dehydration rate exceeded 90%. Thereafter 1360 g of PO was gradually charged at 105° C. under pressure of 4 kg/cm²G and reacted for 150 minutes. After finishing the reaction, the unreacted PO was removed from the reaction mixture to obtain 1700 g crude polyoxyalkylene polyol.

Neutralization was conducted by adding 5% by weight of water and an equimolar amount of phosphoric acid to cesium hydroxide to the crude polyoxyalkylene polyol. After neutralization, water was removed and deposited cesium salt was separated. Water was added to the separated cesium salt to form a 15% aqueous solution (aqueous solution H) having a phosphoric acid ion concentration of 54.5 mg/ml.

Successively, 100 ml of the aqueous solution H and 200 ml of the OH type anion exchange resin (LEWATIT MP 500) obtained by the same procedures as carried out in Example 1 were charged in a flask and stirred at 20° C. for 15 minutes to adsorb phosphoric acid ion. The mixture was filtered to obtain an aqueous cesium hydroxide solution containing a very small amount of cesium salt (phosphoric acid ion concentration of 1.09 mg/ml).

However, these examples are not intended to limit the scope of the present invention. This may be practiced or embodied in still other ways without departing from the spirit or essential character thereof.

We claim:

1. A process for recovering an alkylene oxide polymerization catalyst comprising:

a) adding a neutralizing agent composed of water and a mineral acid or an organic acid to crude polyoxyalkylene polyol containing an alkali metal compound alkylene oxide polymerization catalyst;

b) dehydrating and drying the liquid obtained in step a) and thereafter removing a deposited alkali metal salt by filtration;

c) forming an aqueous alkali metal salt solution from the deposited alkali metal salt of step b); and d) contacting the aqueous alkali metal salt solution of step c) with an OH-type anion exchange resin so as to adsorb the anion of the mineral acid or the organic acid so as to recover the alkylene oxide polymerization catalyst.

2. The process for recovering an alkylene oxide polymerization catalyst of claim 1 wherein the alkali metal compound alkylene oxide polymerization catalyst is metallic cesium, cesium hydroxide or cesium hydroxide monohydrate.

3. The process for recovering an alkylene oxide polymerization catalyst of claim 1 wherein the alkali metal compound alkylene oxide polymerization catalyst metallic rubidium, rubidium hydroxide, or rubidium hydroxide monohydrate.

* * * * *

UNITED STATES PATENT AND TRADEMARK OFFICE
CERTIFICATE OF CORRECTION

PATENT NO. : 5,468,840

DATED: : November 21, 1995

INVENTOR(S) : Tomoki TSUTSUI et al

It is certified that error appears in the above-identified patent and that said Letters Patent is hereby corrected as shown below:

On the Title page, item [57] Abstract:
                line 10, after "recovered" delete "." and insert therefor -- , --.

In the Claims:
<u>Col. 12</u>
In claim 3, line 3, after "catalyst" insert --is--.

Signed and Sealed this

First Day of October, 1996

*Attest:*

BRUCE LEHMAN

*Attesting Officer*         *Commissioner of Patents and Trademarks*